May 7, 1968     T. W. LEE     3,381,835

UTILITY BOX

Filed Dec. 20, 1965

INVENTOR
THEODORE W. LEE

# United States Patent Office 3,381,835
Patented May 7, 1968

3,381,835
UTILITY BOX
Theodore W. Lee, 2359 W. Okechobee Road,
Box D-67, Hialeah, Fla. 33010
Filed Dec. 20, 1965, Ser. No. 515,522
5 Claims. (Cl. 214—450)

ABSTRACT OF THE DISCLOSURE

A utility box that can be removably inserted into the interior of a station wagon for storing all types of equipment, tools, samples, materials and the like, or for storing and hauling dirt, sand, gravel and disposable trash, without scratching or dirtying the wagon interior.

Summary of the invention

In my invention, the box is adapted to be carried on the interior floor of the wagon. The box has an understructure having spring extension members adapted to be removably secured to supporting bolts in the floor. A hollow rectangular tray open at the top is disposed on top of the understructure. The tray and understructure have cooperating bracket means defining first and second rails which are parallel and extend longitudinally within the wagon. Wheel means rotatable in the rails permit the tray to be moved rearward of the understructure.

Brief description of the drawings

In the drawings.

Referring now to FIGS. 1–4, my box identified generally at 10 comprises a top mounted hollow rectangularly shaped tray 12 open at the top and having a vertical rear wall or trail gate 14 hinged at 16 to the bottom 18 of the tray and having removable pins 20 insertable inside vertical walls 22 whereby gate 14 can be opened or closed. The outside surface of the vertical front wall 25 is hinged at 26 to an under structure 27 whereby the tray can be tilted up as desired.

Figure 1:
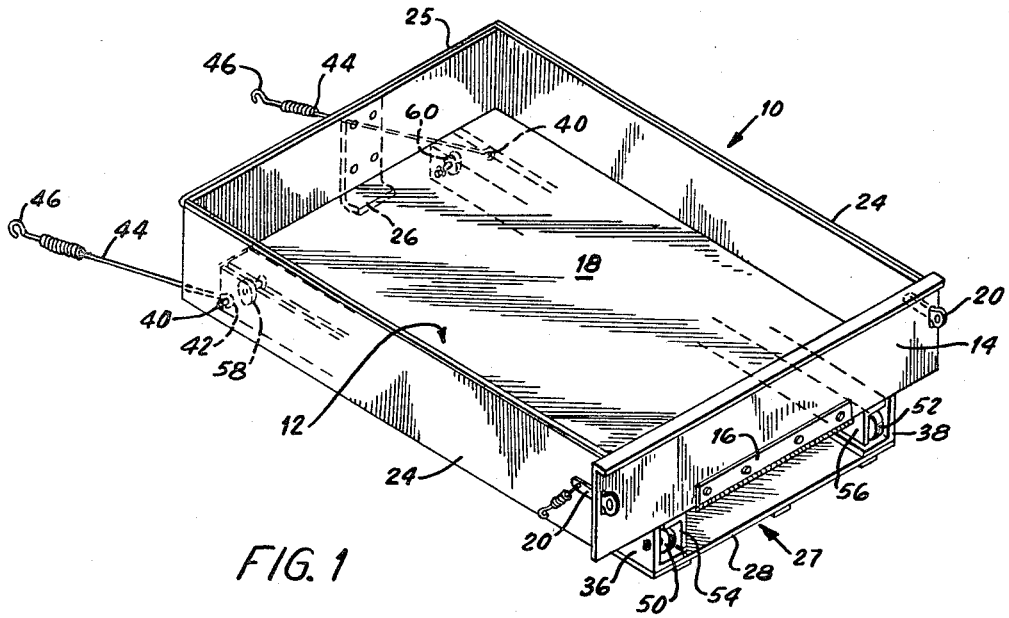
FIG. 1 is a perspective view of my utility box.
Figure 2:
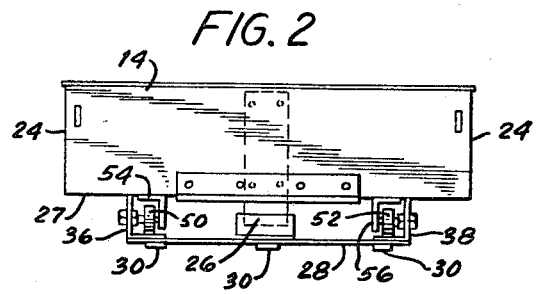
FIG. 2 is a rear end view thereof.
Figure 3:
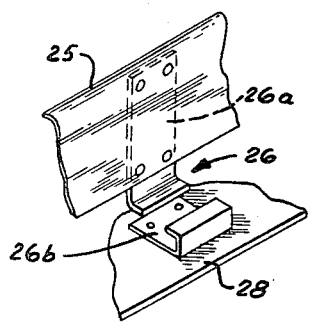
FIG. 3 is a detail view thereof.
Figure 4:
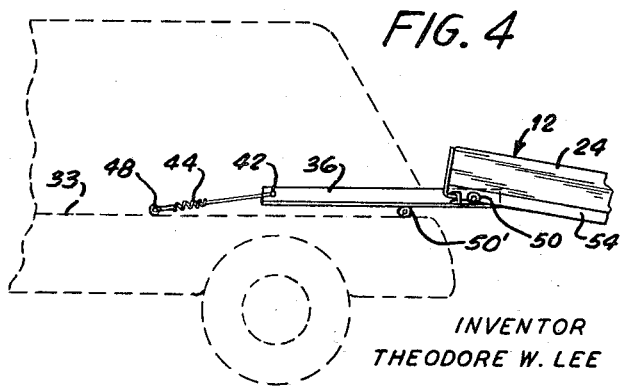
FIG. 4 is a side view of my box as installed in a station wagon.

The under structure 27 comprises a flat plate 28 having rubber strips 30 secured to the underside to prevent plate 28 from scraping the floor interior 33 of a station wagon 35.

Plate 28 carries at opposite sides first and second elongated angle brackets 36 and 38 facing each other and extending longitudinally within the wagon. The front ends of both brackets have prongs 40 adapted to detachably receive the eyes 42 of spring loaded members 44 having front hooks 46 adapted to be detachably secured to bolts 48 in the floor of the wagon. First and second ball or roller bearing wheels 50 and 52 are rotatably secured to the rear ends of brackets 36 and 38 and are arranged to rotate about corresponding axes secured transversely to the corresponding brackets.

The under surface of bottom 18 of the tray also carries at opposite side third and forth elongated angle brackets 54 and 56 facing away from each other and overlying brackets 36 and 38 respectively whereby hollow rails rectangular in cross section are formed. The front ends of brackets 54 and 56 each carry a corresponding one of rotatable ball or roller bearing wheels 58 and 60 secured thereto in the same manner as wheels 50 and 52 are secured to brackets 36 and 38.

Hence tray 12 can be rolled backward along the rails to a position at which the front wheels 58 and 60 are in contact with corresponding wheels 50 and 52 whereby the tray extends rearward beyond the open back door of the wagon and gate 14 can be opened for easy dumping. Moreover, the tray can be rolled forward to the position shown in FIG. 1 for storage inside the wagon. Note that hinge 26 is composed of detachable parts 26a and 26b which permit the tray not only to be tilted but act as a detachable catch that either holds the tray in storage position or permits the tray to be released to be rolled backward. Plate 28 can be rolled backward along a removable piece of pipe 50' inserted between plate 28 and floor.

While I have described my invention with particular reference to the drawings, my protection is to be limited only by the terms of the claims which follow.

Having thus described my invention, I claim as new and desire to secure by Letters Patent:

1. A utility box adapted to be carried on the interior floor of a station wagon, said box comprising an understructure having spring extension members adapted to be removably secured to supporting bolts in said floor, a hollow rectangular tray open at the top overlying said understructure, said tray and said understructure having cooperating bracket means defining first and second rails which are parallel and extend longitudinally within the wagon, wheel means rotatable in said rails to permit said tray to be moved rearward of the understructure, and detachable catch means having separable first and second elements secured respectively to said tray and said understructure, said elements having a first holding position at which the tray is held in storage and a second position at which the tray can be released to be rolled rearward and at which the tray can be tilted with respect to the understructure.

2. A box as set forth in claim 1 wherein said wheel means include four wheels, two wheels being rotatably secured to the bracket means of said understructure, the other two wheels being rotatably secured to the bracket means of said tray.

3. A box as set forth in claim 2 wherein the bracket means of the understructure include first and second angle members extending horizontally and longitudinally and having front and rear ends, each of the said two wheels being secured to the rear end of the corresponding first and second members.

4. A box as set forth in claim 3 wherein the bracket means of the tray includes third and fourth angle members extending horizontally and longitudinally and having front and rear ends, each of said other two wheels being secured to the front end of the corresponding third and fourth members.

5. A box as set forth in claim 4 wherein said tray is provided with a rear tail gate.

References Cited

UNITED STATES PATENTS

| | | | |
|---|---|---|---|
| 2,094,401 | 9/1937 | Girl | 214—83.24 X |
| 2,470,314 | 5/1949 | Lim | 224—42.44 X |
| 2,545,269 | 3/1951 | Ford | 224—42.44 X |
| 3,058,636 | 10/1962 | Bilbeisi | 214—450 X |
| 3,084,816 | 4/1963 | Bozio | 214—83.24 |

GERALD M. FORLENZA, *Primary Examiner.*
ALBERT J. MAKAY, *Examiner.*